US005688865A

United States Patent [19]
Ali et al.

[11] Patent Number: 5,688,865
[45] Date of Patent: Nov. 18, 1997

[54] PROCESS AND SYSTEM FOR PREVENTING PRESSURE TAP FOULING IN TANDEM POLYMERIZATION REACTORS

[75] Inventors: Ahmed H. Ali, Somerset; Robert O. Hagerty, Metuchen, both of N.J.

[73] Assignee: Mobil Oil Corporation, Fairfax, Va.

[21] Appl. No.: 941,345

[22] Filed: Sep. 4, 1992

Related U.S. Application Data

[63] Continuation-in-part of Ser. No. 934,290, Aug. 24, 1992, which is a continuation of Ser. No. 665,054, Mar. 6, 1991, abandoned.

[51] Int. Cl.$^6$ .................................................. C08F 2/34
[52] U.S. Cl. .................... 525/53; 525/246; 525/247; 525/268; 525/270; 525/324
[58] Field of Search ..................... 525/53, 245, 246, 525/247, 268, 270, 324; 526/62, 65, 66, 74, 81

[56] References Cited

U.S. PATENT DOCUMENTS

| | | | |
|---|---|---|---|
| 4,048,412 | 9/1977 | Caumartin et al. | 526/65 |
| 4,336,352 | 6/1982 | Sakurai et al. | 525/240 |
| 4,338,424 | 7/1982 | Morita et al. | 526/65 |
| 4,390,669 | 6/1983 | Morita et al. | 526/65 |
| 4,420,592 | 12/1983 | Kato et al. | 526/65 |
| 4,461,873 | 7/1984 | Bailey et al. | 525/240 |
| 4,481,301 | 11/1984 | Nowlin et al. | 502/104 |
| 4,525,322 | 6/1985 | Page et al. | 264/531 |
| 4,532,311 | 7/1985 | Fulks et al. | 526/62 |
| 4,547,551 | 10/1985 | Bailey et al. | 525/240 |
| 4,603,173 | 7/1986 | Mack et al. | 525/194 |
| 4,703,094 | 10/1987 | Raufast | 526/65 |
| 4,792,588 | 12/1988 | Suga et al. | 525/240 |
| 4,803,251 | 2/1989 | Goode et al. | 526/59 |
| 4,855,370 | 8/1989 | Chirillo et al. | 526/74 |
| 4,876,320 | 10/1989 | Fulks et al. | 526/62 |
| 4,975,485 | 12/1990 | Sato et al. | 525/53 |
| 5,047,468 | 9/1991 | Lee et al. | 525/53 |

FOREIGN PATENT DOCUMENTS

| | | |
|---|---|---|
| 369436 | 5/1990 | European Pat. Off. . |
| 0503791 | 9/1992 | European Pat. Off. . |

OTHER PUBLICATIONS

Chemical Abstracts; vol. 102; No. 6; Feb. 1, 1985; Columbus, Ohio: Abstract No. 46432V "Ethylene Coplymers"; p. 13.

Chemical Abstracts; vol. 102; No. 6, Feb. 1, 1985; Columbus, Ohio; Abstract No. 46433W "Ethylene Copolymers"; p. 13.

*Perry's Chemical Engineers' Handbook,* 6th Ed., McGraw-Hill, New York, 1984, pp. 5-14.

*Primary Examiner*—R. H. Delmendo
*Attorney, Agent, or Firm*—Dennis P. Santini; Marina V. Schneller

[57] ABSTRACT

A process and system for prevention of fouling of pressure taps in a first gas phase fluidized bed polymerization reactor while avoiding sheeting during production of polyolefins in a second downstream gas phase fluidized bed polymerization reactor wherein a relatively small amount of water is added directly to the pressure taps of the first reactor.

8 Claims, 2 Drawing Sheets

PROCESS AND SYSTEM FOR PREVENTING PRESSURE TAP FOULING IN TANDEM POLYMERIZATION REACTORS

CROSS-REFERENCE TO RELATED APPLICATIONS

This application is a continuation-in-part of application Ser. No. 07/934,290, filed on Aug. 24, 1992, which in turn is a continuation of application Ser. No. 07/665,054, filed Mar. 6, 1991 and now abandoned.

BACKGROUND OF THE INVENTION

The present invention relates to the prevention of fouling of pressure taps of a first-stage fluidized bed reactor used to produce bimodal ethylene polymer compositions in a two-stage or tandem reactor system.

In the tandem reactor process, a relatively high molecular weight polymer is produced in one reactor, and this product is combined with a relatively low molecular weight polymer produced in a second reactor to form a polymer composition of bimodal molecular weight distribution. Bimodal products may be produced with tandem reactors in either sequence, i.e. high molecular weight polymer in the first stage reactor followed by low molecular weight polymer in the second stage, or vise versa. When high molecular weight polymer is produced in the first stage (HMW-first), the low resin flow index and low catalyst productivity combine to cause positive static which often leads to fouling of the reactor pressure taps. The pressure taps are used to monitor and control bed weight, and when the pressure taps are fouled, effective system control is lost. The conventional method of controlling positive static is to feed a small amount of water to the reactor recycle line, typically 1 to 3 part per million by volume (ppmv). However, this conventional method was not suitable for use in the first stage of the HMW-first tandem reactor process. When water addback was fed to the first reactor in sufficient quantity to reduce the positive static and eliminate tap fouling, very high negative static was developed in the second reactor. The high negative static eventually caused sheeting in the second reactor.

An example of the conventional method is U.S. Pat. No. 4,855,370 which teaches a method for reducing sheeting during alpha-olefin polymerization in a low pressure fluidized bed reactor. The method comprises introducing water into the reactor by passing a pressurized inert gas at a controlled rate of flow through a temperature controlled container containing water to add water to the inert gas. The humidified gas is then directed into the olefin feedstock to obtain a mixture. The mixture is then added to the reactor for fluidization.

U.S. Pat. No. 4,803,251 also discloses a method for reducing sheeting during polymerization of alpha-olefin in a low pressure fluidized bed reactor. This method comprises determining the electrostatic levels at the sites of possible sheet formation in the fluid bed reactor. If negative electrostatic levels are indicated, a positive charge-generating chemical compound is added to the reactor. If positive electrostatic levels are indicated, a negative charge-generating chemical compound is added to the reactor. Examples of positive charge-generating chemicals are $C_1$–$C_7$ alcohols, oxygen and nitric oxide. Examples of negative charge-generating chemicals are $C_3$–$C_7$ ketones and water vapor.

SUMMARY OF THE INVENTION

In accordance with the present invention there is provided a process for preventing fouling of the pressure taps in a first gas phase fluidized bed polymerization reactor while avoiding sheeting during production of bimodal ethylene polymer compositions in a second gas phase fluidized bed polymerization reactor. The process includes adding a relatively small amount of water directly to the pressure taps of the first reactor. The water can be added continuously or intermittently during the process of preparing the bimodal compositions.

The water is preferably added by admixing it with an inert gas such as nitrogen, and the mixture is fed directly to the pressure taps of the first reactor. Also, the water is preferably added through an orifice to provide sonic or choked flow to make the flow rate independent of reactor pressure.

Thus the present invention prevents pressure tap fouling by feeding small quantities of water directly to the pressure taps of the first reactor. Furthermore, unexpectedly lower quantities of water, about 0.1–0.6 ppmv are required using this method. This moisture level is much smaller than the 1 to 3 ppmv required by the prior art conventional method. The pressure tap clearing was unexpected because static, at about 500–800 pA, was still significantly high. However, with the lower feed rates, negative static was not generated in the second reactor.

The prior art method of controlling positive reactor static with water addition is not suitable for the first stage of tandem reactor process of the present invention. When water is added in sufficient quantity to the first reactor in accordance with the prior art to control positive static and eliminate pressure tap fouling, undesirable negative static is induced in the second reactor. It was discovered that by adding water directly to the pressure taps in the first reactor, the quantity of water required was greatly reduced and negative static was not induced in the second reactor.

In both of the above discussed prior art U.S. Pat. Nos. 4,855,370 and 4,803,251, the water or alcohol is added to the reactor recycle line to produce a dispersion throughout the entire reactor volume. In the present invention, the water is added directly to a pressure tap, which produces an effect that is apparently localized to the immediate vicinity of the tap. The required quantity of water is reduced and the overall static level in both reactors is largely unaffected.

From the foregoing description of the present invention, it will be apparent that a principal object of the present process is to provide for continuous operation of tandem fluidized bed reactors without fouling of the pressure taps in the first reactor. Other objects, features and advantages of the present process will be readily apparent to those skilled in the art upon reading the following disclosure.

DESCRIPTION OF SPECIFIC EMBODIMENTS

Figure 1:
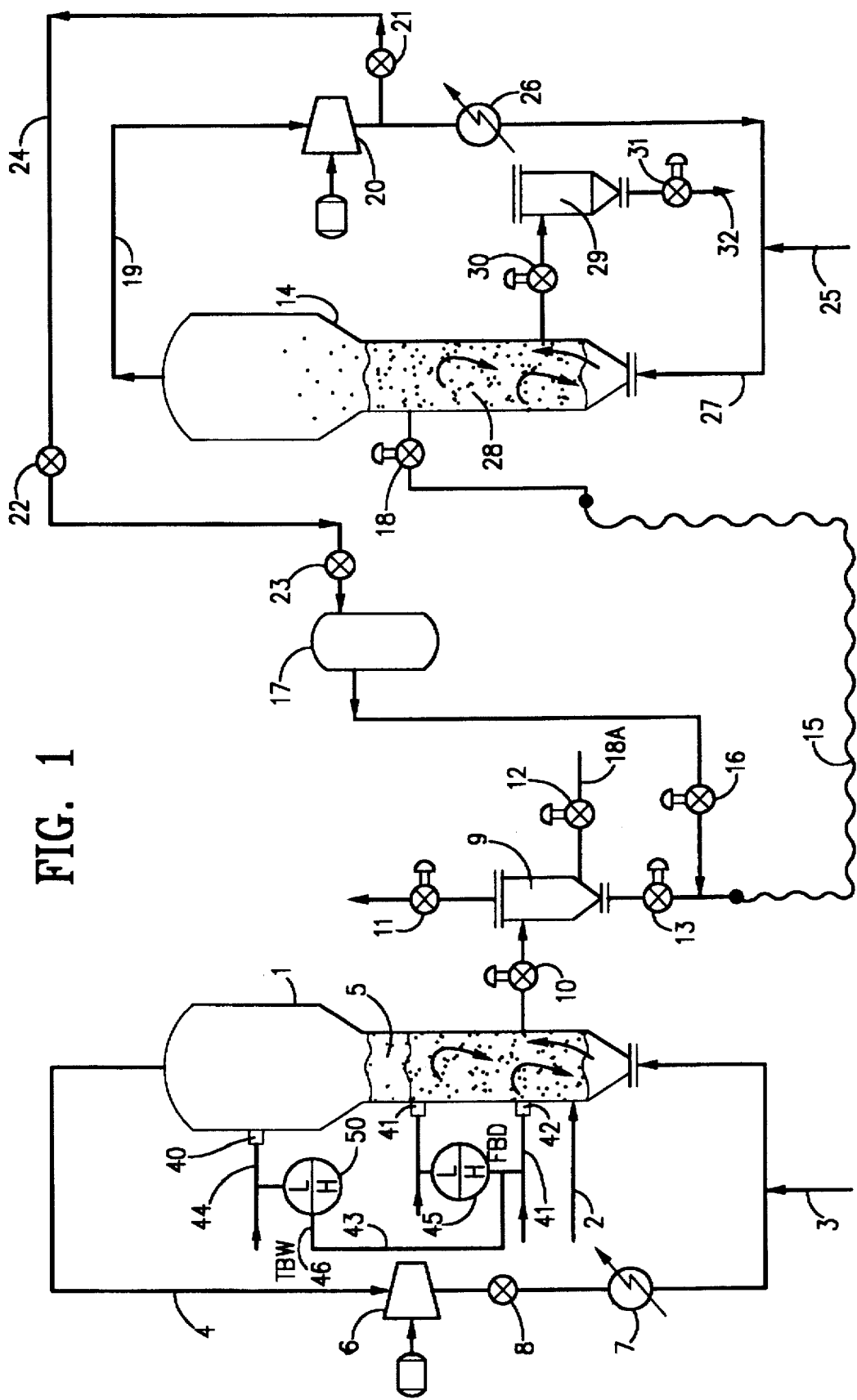
FIG. 1. is schematic diagram of a pair of tandem reactors incorporating an embodiment of the present invention.

Referring now to FIG. 1, there is shown a tandem reactor system wherein a catalyst component containing transition metal, e.g. titanium, is fed into a first reactor 1 through line 2. Ethylene, comonomer, e.g., 1-hexene, if used, hydrogen, if used, inert gas such as nitrogen, if used, and cocatalyst, e.g. triethylaluminum (TEAL), are fed through line 3 into recycle line 4 where they are combined with recycle gas and fed into the bottom of the first reactor 1. The gas velocity is high enough and the size and density of the particles in the reactor 1 are such as to form a fluidized or dense bed 5 comprising catalyst particles associated with polymer formed by the polymerization of ethylene and, if present, comonomer within the reactor 1. The conditions in the reactor 1, e.g. partial pressure of ethylene, hydrogen/ethylene molar ratio, temperature, total pressure, etc. are controlled such that the polymer which forms is of relatively high molecular weight (HMW). Recycle gas leaving the top of the reactor 1 through the line 4 is recompressed in a compressor 6, cooled in a heat exchanger 7 after being combined with make-up gases and cocatalyst from line 3 as described.

Periodically, when sufficient HMW polymer has formed in the first reactor 1, a portion of the polymer and catalyst is withdrawn from the fluid bed 5 and are transferred to a discharge tank 9, by opening a valve 10 while valves 11,12 and 13 remain closed. When a desired transfer amount of the HMW polymer and catalyst from reactor 1 has been fed to a discharge tank 9, the transfer system to a second reactor 14 is activated by opening the valve 13 to force the HMW polymer and catalyst into a transfer hose 15. The valve 13 is then closed to isolate the transfer hose 15 from the discharge tank 9 and the valve 11 is opened, ensuring that any gases leaking though the valve 13 are vented, and do not back-leak across the valve 10 into the reactor 1. The transfer hose 15 is then pressurized with reactor-cycle gas from the reactor 14 by opening a valve 16. To minimize upsets in the reactor 14, a surge vessel 17 is used to store gas for pressuring the transfer hose 15. With the valve 16 still in the open position, the valve 18 is opened to convey HMW polymer and catalyst into the rector 14. Both of the valves 16 and 18 are left open for a period to sweep the transfer hose 15. The valves 18 and 16 are then closed sequentially. The transfer hose 15 is then vented by opening the valve 13, the valve 11 having remained open during the transfer operation. The discharge tank 9 is then purged with purified nitrogen through a line 18A by opening the valve 12.

During the transfer, cycle gas comprising hydrocarbons and hydrogen leaves the reactor 14 through a line 19, is compressed by a compressor 20, flows though valves 21,22 and 23 in a line 24 and through a surge tank 17, a valve 16 and the pressurized transfer hose 15 as described, thus effecting the transfer of HMW polymer and catalyst to the second reactor 14.

After the transfer to the reactor 14 is effected, the flow of gas from the reactor 14 to the transfer hose 15 is stopped by closing the valves 21,22,23,16. Ethylene, hydrogen, comonomer, e.g., 1-hexene, if used, inert gas such as nitrogen, if used, and cocatalyst or catalyst component, if used, e.g., TEAL, are fed to the reactor 14 through a line 25 after being combined with unreacted cycle gas leaving the top of the reactor 14 through a line 27. The gas velocity and size and density of the particles in the reactor 14 are such as to form a fluidized or dense bed 28 of bimodal polymer particles associated with the catalyst, including the transition metal primary catalyst component added to the reactor 1.

The conditions in the second reactor 14, e.g., partial pressure of ethylene, hydrogen/ethylene ratio and temperature, are controlled such that a relatively low molecular weight (LMW) polymer forms primarily within the voids of the HMW polymer/catalyst particles transferred from the reactor 1. After a sufficient amount of LMW polymer has formed resulting in a bimodal polymer having a desirable molecular weight distribution and other properties, a portion of the polymer bed 28 is transferred to a discharge tank 29 by opening a valve 30 while keeping a valve 31 closed. After substantially all the polymer has been transferred to the discharge tank 29, it is collected by closing the valve 30 and opening the valve 31, resulting in the pressure discharge of the final polymer product through a line 32.

The thus described system of FIG. 1 is disclosed in copending application Ser. No. 07/934,290, filed Aug. 24, 1992 for Process for Producing Bimodal Ethylene Polymers in Tandem Reactors. application Ser. No. 07/934,290 is incorporated herein by reference.

As disclosed in application Ser. No. 07/934,290, bimodal ethylene polymer blends having a desirable combination of processability and mechanical properties are produced by a process including the steps of polymerizing gaseous monomeric compositions comprising a major portion of ethylene in at least two gas phase, fluidized bed reactors 1,14 operating in the tandem mode under the following conditions. In the first reactor 1, a gas comprising monomeric composition and, optionally, a small amount of hydrogen, is contacted under polymerization conditions with a Ziegler-Natta or coordination catalyst comprising a transition metal compound as primary catalyst component and a reducing agent such as an organometallic compound or metal hydride as cocatalyst, at a hydrogen/ethylene molar ratio of no higher than about 0.3 and an ethylene partial pressure less than about 100 psia. These conditions produce a relatively high molecular weight (HMW) polymer powder wherein the polymer powder containing the catalyst is then transferred to a second reactor 14 with, optionally, additional cocatalyst which may be the same or different from the cocatalyst utilized in the first reactor but with no additional transition metal catalyst component, together with a gaseous mixture comprising hydrogen and monomeric composition wherein additional polymerization is carried out at a hydrogen/ethylene molar ratio of at least about 0.9, the ratio being sufficiently high such that it is at least about 8.0 times that in the first reactor, and an ethylene partial pressure greater than about 1.7 times that in the first reactor, to produce a relatively low molecular weight (LMW) polymer much of which is deposited on or within the HMW polymer/catalyst particles from the first reactor, such that the fraction of HMW polymer in the bimodal polymer leaving the second reactor is at least about 0.35 to 0.75. Further, the monomeric compositions either consists essentially of ethylene or is a mixture of ethylene and 1-olefin containing 4 to 10 carbon atoms. Still further, the molar ratio of 1-olefin to ethylene is from about 0.005 to about 0.7.

The gaseous monomer entering both reactors 1,14 may consist wholly of ethylene or may comprise a preponderance of ethylene and a minor amount of a comonomer such as a 1-olefin containing 3 to about 10 carbon atoms. Comonomeric 1-olefins which may be employed are, for example, 1-butene, 1-pentene, 1-hexene, 4-methyl-1-pentene, 1-octene, 1-decene, and mixtures thereof. The comonomer may be present in the monomeric compositions entering either or both reactors 1,14.

Hydrogen may or may not be used to modulate the molecular weight of the HMW polymer made in the first reactor 1. Thus, hydrogen may be fed to the first reactor 1 such that the molar ratio of hydrogen to ethylene ($H_2/C_2$ ratio) is, for example, less than about 0.3, preferably about 0.005 to 0.2. In the second reactor 14 it is necessary to produce a LMW polymer with a low enough molecular weight and in sufficient quantity so as to produce a bimodal resin which can be formed, with a minimum of processing difficulties, into end use products such as films and bottles having a superior combination of mechanical properties. For this purpose, hydrogen is fed to the second reactor 14 with the ethylene containing monomer such that the hydrogen to ethylene mole ratio in the gas phase is greater than about 0.9, preferably in the range of about 0.9 to 5.0 and most preferably in the range of about 1.0 to 3.5. Moreover, to provide a sufficient difference between the molecular weights of the polymers in the first and second reactors 1,14 so as to obtain a bimodal resin product having a wide enough molecular weight distribution necessary for the desired levels of processability and mechanical properties, the hydrogen to ethylene mole ratios in the two reactors 1,14 should be such that the ratio in the second reactor 14 is at least about 8.0 times the ratio in the first reactor, for example in the range 8.0 to 10,000 times such ratio, and preferably 10 to 200 times the ratio in the first reactor 1.

If desired for any purpose, e.g., to control superficial gas velocity or to absorb heat of reaction, an inert gas such as nitrogen may also be present in one or both reactors 1,14 in addition to the monomer and hydrogen. Thus the total pressure in both reactors may be in the range, for example, of about 100 to 600 psig, preferably about 200 to about 350 psig.

The superficial gas velocity through both reactors 1,14 is sufficiently high to disperse effectively the heat of reaction so as to prevent the temperature from rising to levels which could partially melt the polymer and shut the reactor down, and high enough to maintain the integrity of the fluidized beds 1,14. Such gas velocity is in the range, for example, of about 40 to 120, preferably about 50 to 90 cm/sec.

The catalyst used in the polymerization is a Ziegler-Natta catalyst, also referred to in the literature as a coordination catalyst. These catalysts are composed of a transition metal compound as primary catalyst component agent, and a reducing agent as cocatalyst, generally an organometallic compound, or a metal hydride. The transition metal may be, for example any of those in Groups IVb, Vb, VIb of the Periodic Table and is preferably titanium, e.g., in the form of a halide such as titanium trichloride or tetrachloride, while the metal of the organometallic compound or metal hydride may be selected from those in Groups Ia, IIa or IIIa of the Periodic Table, and such as an alkyl aluminum halide or an aluminum trialkyl.

The foregoing conditions provide for a process wherein there is an accumulation of positive static in the first fluidized bed reactor 1. Positive static causes fouling of the reactor pressure taps which are used to monitor and control bed weight and height.

It is theorized that a build-up of positive static in the first reactor 1 is a result of the production of a low flow index (HMW) resin component in the first reactor 1 of the fluidized bed tandem reactor system. The flow index (FI) of thus resin component is about 0.1 to 1.0.

Another contributing factor to the increased positive static in the first reactor 1 is the low catalyst productivity of about 1200 to 2000 pounds of polymer resin per pound of catalyst. The combination of low flow index resin component and low catalyst productivity causes a high level of positive static charge to develop in the first fluidized bed reactor. It is not uncommon for the positive static to increase to about several hundred thousand volts.

Because of practical difficulties associated with measuring high voltage levels in commercial reaction systems, the static charge is normally not measured directly. A safer, relative indication may be obtained by use of a low voltage static probe, consisting of a small metal rod extending through the reactor wall into the fluid bed. A high pressure electrical feed through is used to mount the rod to the reactor wall, and to conduct a signal from the rod to a sensitive current meter located outside of the reactor. An example of a suitably sensitive current meter is a Keithly model 485 pico ammeter. For a typical probe with an exposed rod area of 6 cm$^2$, a high positive static charge indication is about +500 pico-amps (pA) or higher, and a high negative charge indication is -500 pA or higher in magnitude.

Polymer particles accumulate static charges which cause the particles to adhere or cling to the walls of the reactor. The accumulation of particles on the reactor walls results in many problems including poor heat transfer in the polymerization process. Polymer particles that adhere to the walls of the reactor continue to polymerize and often fuse together and form lumps, which can be detrimental to a continuous polymerization process.

In a gas phase olefin polymerization process utilizing a series of fluidized bed reactors, a stream of olefin gas 3 is fed into the bottom of the first reactor 1. Polymerization catalyst particles 2 and other solid components are fluidized by the gas passing upwardly through a distribution plate into the polymerization zone of the reactor.

The monomers and/or comonomers polymerized on the polymerization catalyst particles which are withdrawn from the fluidized bed section of the reactor 1 are passed to a second fluidized bed reactor 14 along with unreacted monomer.

The critical static voltage level for sheet formation is a complex function of resin sintering temperature, operating temperature, drag forces in the fluid bed, resin particle size distribution and recycle gas composition. "Sheets" can be characterized as constituting a fused polymeric material. The sheets vary widely in size, but are similar in most respects. They are usually about ¼ to ½ inch in thickness and are from about one to five feet long. They have a width of about 3 inches to more than 18 inches. The sheets have a core composed of fused polymer which is oriented in the long direction of the sheets and their surfaces are covered with granular resin which has fused to the core. The edges of the sheets have a stranded or frayed appearance from strands of fused polymer.

Although the sheeting mechanism is not fully understood, it is believed that static electricity generated in the fluid bed charges resin particles. When the charge on the particles reaches the level where the electrostatic forces trying to hold the charged particle near the reactor wall exceed the drag forces in the bed trying to move the particle away from the wall, a layer of catalyst containing, polymerizing resin particles forms a non-fluidized layer near the reactor wall. Heat removal from this layer is not sufficient to remove the heat of polymerization because the non-fluidized layer near the wall has less contact with the fluidizing gas than do particles in the fluidized portion of the bed. The heat of polymerization increases the temperature of the nonfluidized layer near the reactor wall until the particles melt and fuse. At this point, other particles from the fluidized bed will adhere to the fused layer and it will grow in size until it comes loose from the reactor wall.

Pressure taps 40,41,42 are located at various levels of the first fluidized bed 1. They are typically openings having a diameter of about 3/16 inch in the side of the reactor shell. The pressure taps are operatively connected to the gauges 45,50 for measuring differential pressures in the fluidized bed. Differential pressure (DP) readings between pairs of pressure taps 40,41,42 are employed to determine parameters such as fluidized bulk density (FBD) and total bed weight (TBW). It is critical that the pressure taps are not partially or completely fouled to obtain accurate DP readings. Since the DP readings are used to control the bed level through automatic operation of the discharge system, a false high DP reading can cause the automatic bed level control to reduce the fluid bed level to a undesirable low point. A false low DP reading can cause the fluid bed level to be raised to an undesirably high point, possibly encompassing the full reactor volume. Either situation demands a full shut-down of the tandem reactor system, causing loss of valuable time and product.

Prior to the present invention, a flow of dry, purified nitrogen (or optionally ethylene) at a rate of about 0.7 to 1.0 lb/hr would be directed through the pressure taps 40,41,42 to sweep out any catalyst and resin particles. For normal reaction conditions this sweep gas flow is adequate to prevent fouling of the taps.

However, it has been found that for the HMW conditions in the first stage tandem reactor process, this sweep gas flow is not adequate to prevent blockage of the taps when positive static is present in the reactor. Blockage of the taps is encountered whenever a significant amount of positive static is present in the reactor, causing severe problems in controlling the level of the fluidized bed. Increasing the flow rate of the sweep gas is not effective in preventing the blockage.

Although not wishing to be bound by theory, it is believed that catalyst rich, low FI resin particles are forced by positive static into the pressure taps 40,41,42 of the first fluidized bed reactor 1. Once lodged in the presssure taps, the particles continue to polymerize, generating heat of polymerization. There is no adequate mechanism for the removal of such said heat of polymerization. As a consequence, the resin particles sinter or melt, which causes the pressure taps to be either partially or fully blocked.

In accordance with the present invention, fouling of the pressure taps is prevented by adding a stream of nitrogen gas (as represented by the three arrows in FIG. 1) containing a small amount of water directly to the pressure taps 40, 41 and 42 as by lines 44, 46 and 47. In a preferred embodiment the nitrogen gas is added to the taps at critical or sonic velocity. Further, the amount of water added to the taps is insufficient to reduce or eliminate the positive static in the first reactor 1.

Figure 2:
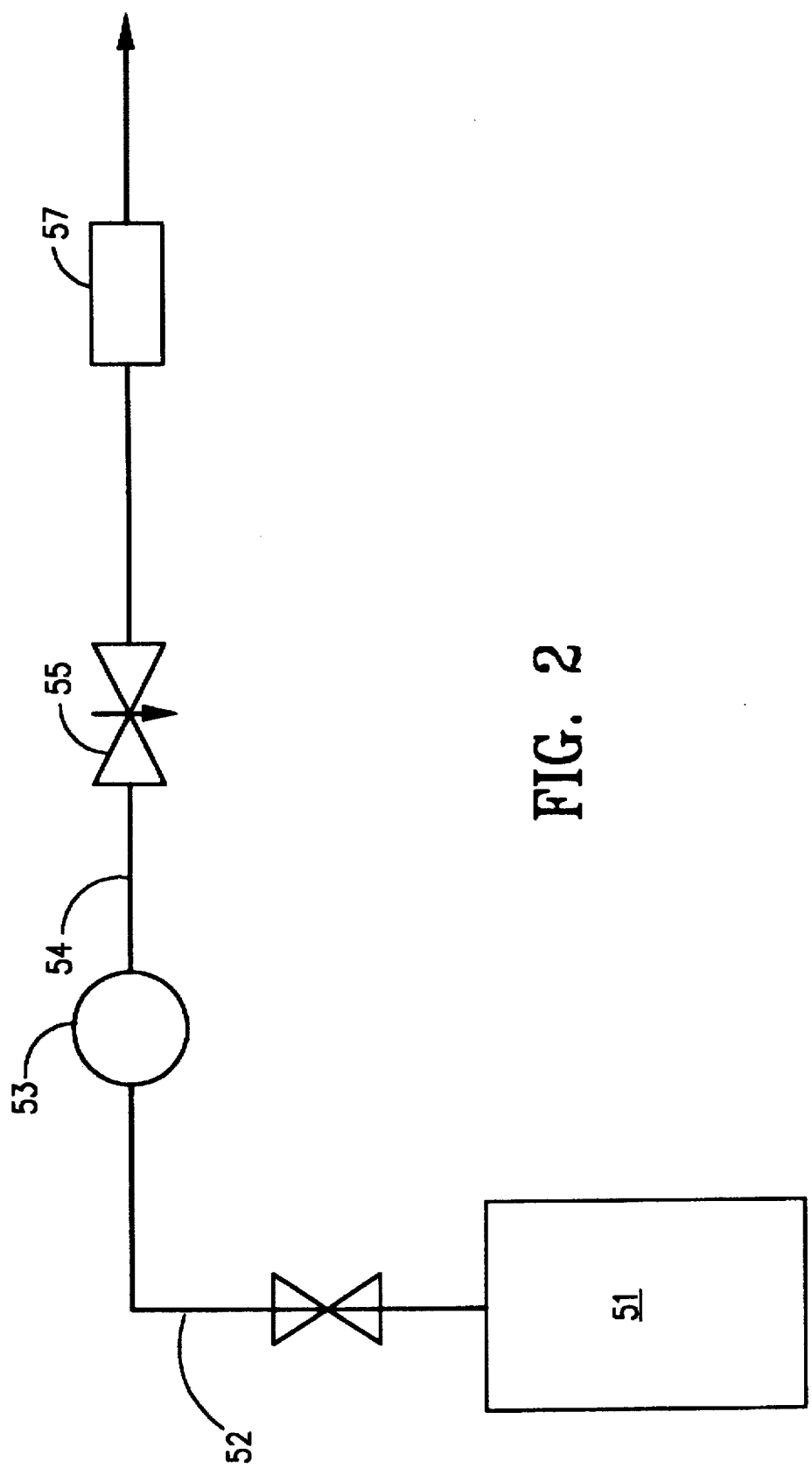
FIG. 2. is a schematic diagram of a pressurized nitrogen system for supplying water to the taps of the first reactor in accordance with the present invention.

Referring to FIG. 2, nitrogen from a tank 51 of premixed nitrogen and water at a pressure of about 2000 psi passes through a two-stage pressure regulator 53 as by a line 52. The pressure of the gas is reduced to about 800 psi by the regulator 53. The depressurized gas stream enters a critical flow orifice 55 as by line 54 wherein the pressure is reduced to about 400 psi. In a preferred embodiment, the critical flow orifice is a variable area needle valve. The flow of humidified nitrogen passes through a fixed orifice 57 which acts as a safety device, preventing accidental increases in flow rate, and is added directly to one of the pressure taps 40,41,42 the of fluidized bed reactor 1.

In a preferred embodiment, moist nitrogen containing water in an amount of about 20 to 30 ppmv by volume of gas is directed to the reactor pressure taps 40,41,42 from the pressurized tank 51. The feed rate of the moist nitrogen is independent of reactor pressure because of the design features of the nitrogen flow line which incorporates the orifice 55,57 to make the gas velocity reach the speed of sound. It is known to those skilled in the art that when the ratio of gas pressures across an opening is about 2:1, the gas velocity achieves sonic speed. This principle of sonic or "choked" flow allows for precise control of gas feed rate without regard for pressure variables within the downstream fluidized bed reactor.

For a more complete review of critical or sonic velocity and critical flow nozzles see *Perry's Chemical Engineers' Handbook* (6th Edition) Don W. Green (editor), McGraw-Hill Book Company, New York, 1984, pp. (5-20)–(5-61), incorporated herein by reference.

Fouling of the pressure taps 40,41,42, has been associated with an increase in positive static. As discussed above, the standard method of controlling positive static is to feed an amount of water to the reactor. In the standard method, water is added to the reactor recycle line or the like in order to produce a dispersion of the negative static "drivers" throughout the entire volume of the reaction zone. The water is added in quantity of about 1 to 3 parts per million by volume of ethylene feed (ppmv). This quantity achieves reduction of positive static in the reactor, but causes very high negative static in the second reactor 14 of the tandem system. The high negative static causes sheeting to occur in the second reactor 14.

Although not wishing to be bound by theory, we believe that the water added to the reactor chemically combines with the TEAL cocatalyst to produce negative static "drivers". If enough water is added to produce an effective amount of "drivers", a neutralization of the positive static will occur. Once formed, these negative static "drivers" are directed to the second fluidized bed reactor of the tandem system, causing an increase in negative static in the second reactor which in turn results in sheeting.

The present process reduces the quantity of water to about 0.1 to about 0.6 ppmv based on total ethylene feed to the reactor, and feeds the water directly to the pressure taps of the first fluidized bed reactor. Although positive static in the first reactor remains generally high, about 500–800 pA, the pressure taps are fully cleared and negative static is not generated in the second reactor. In a preferred embodiment, the quantity of water is about 0.3 ppmv.

EXAMPLE 1

A tandem reactor system was operated under conditions for the preparation of bimodal ethylene polymers. The tandem system comprises a first reaction zone for the preparation of high molecular weight ethylene (co)polymers and a second reaction zone for the preparation of low molecular weight ethylene (co)polymers in the presence of the high molecular weight product from the first zone to obtain a bimodal ethylene polymer.

During operation of the tandem system, a water-containing nitrogen gas is fed directly to the pressure taps of the first reaction zone. The nitrogen gas contained about 0.3 ppmv water based on ethylene feed to the first reactor. The measurement of positive static in the first reactor remained at about 500 pA even after the addition of the water-containing nitrogen gas. Throughout the period of operation of the tandem system, measurements of fluidized bulk density (FBD) and total bed weight (TBW) were conducted without any plugging of the pressure taps of the first reactor. Also, there was no problem with build-up of negative static in the second reaction zone.

EXAMPLE 2

Since the flow of water-containing nitrogen gas effectively doubles the gas flow rate in the pressure taps, it was theorized that a water-free "dry" nitrogen gas could be used to clear the pressure taps if the flow rate was increased from about 1.5 lb/hr to 3 lb/hr. To test this theory, a tandem reactor system as in Example 1 was brought online and operated under conditions for the preparation of bimodal ethylene polymers. The flow rate of "dry" nitrogen to each pressure tap of the first reaction zone was increased to 3 lb/hr. After a period of operation, the pressure taps began to foul. Therefore, a mere increase in gas flow rate does not prevent pressure tap fouling.

EXAMPLE 3

In a preferred method of feeding a water-containing nitrogen gas to the pressure taps of a first reaction zone, as in Example 1 a tank of pressurized nitrogen gas (2000 psi) is operatively connected to each reactor pressure tap. The nitrogen gas is unpurified and contains about 20–30 ppmv of water by volume of gas. The gas valve is opened and gas passes through a two-stage pressure regulator and enters a variable area orifice where the pressure is dropped from about 800 psi to about 400 psi. In a preferred embodiment, the variable area orifice is a needle valve. Gas exits the needle valve at sonic velocity and passes through an orifice which acts as a limiting device. The flow of gas then enters the reactor pressure tap.

While particular embodiments of the invention have been shown and described, various modification are within the true spirit and scope of the invention. The appended claims are, therefore, intended to cover all such modification.

What is claimed is:

1. A process for producing a bimodal ethylene polymer blend comprising the steps of:

contacting in a first gas phase, fluidized bed reaction zone under polymerization conditions a gaseous monomeric composition comprising a major portion of ethylene and, optionally, hydrogen to provide a molar ratio of hydrogen to ethylene of less than about 0.3, with a Ziegler-Natta catalyst comprising a transition metal compound as a primary catalyst component and an organometallic compound or metal hydride as reducing cocatalyst to produce a first zone product which is a high molecular weight (HMW) polymer associated with catalyst particles and has a flow index (FI) of about 0.1 to 1.0;

transferring the first zone product to a second gas phase, fluidized bed reaction zone into which is also fed hydrogen and a gaseous monomeric composition comprising a major proportion of ethylene, but no additional transition metal component of said catalyst to produce a polymer deposited on and within the voids of the HMW polymer/catalyst particles wherein a molar ratio of hydrogen to ethylene in the second gas phase fluidized bed reaction zone ranges from about 0.9 to 5.0; and adding a relatively small amount of water directly to a plurality of pressure taps of the first reaction zone to eliminate fouling of said pressure taps, wherein the amount of added water is insufficient to reduce or eliminate the positive static in the first reaction zone wherein the relatively small amount of water is from about 0.1 to about 0.6 ppmv based on total ethylene feed.

2. The process of claim 1 wherein the bimodal polymer blend obtained from the second reaction zone has a fraction of HMW polymer of about 0.35 to about 0.75; and wherein each of the monomeric compositions either consists essentially of ethylene or is a mixture of ethylene and a 1-olefin containing 4 to 10 carbon atoms, the molar ratio of the 1-olefin to ethylene being from about 0.005 to about 0.7.

3. The process of claim 1 wherein the hydrogen to ethylene molar ratio ($H_2/C_2$ ratio) in the first reaction zone is equal to or less than about 0.3.

4. The process of claim 1 wherein the partial pressure of ethylene in the first reaction zone is equal to or less than about 100 psia.

5. The process of claim 1 wherein the $H_2/C_2$ ratio in the second reaction zone is at least about 8.0 times that in the first reaction zone.

6. The process of claim 1 wherein the partial pressure of ethylene in the second reaction zone is at least 1.7 times the partial pressure in the first reaction zone.

7. The process of claim 1 wherein the amount of water is about 0.3 ppmv.

8. The process of claim 1 wherein the added water is contained in nitrogen gas.

* * * * *